W. H. APPLEBY.
STEERING WHEEL.
APPLICATION FILED NOV. 26, 1915.
1,195,548.
Patented Aug. 22, 1916.
2 SHEETS—SHEET 1.
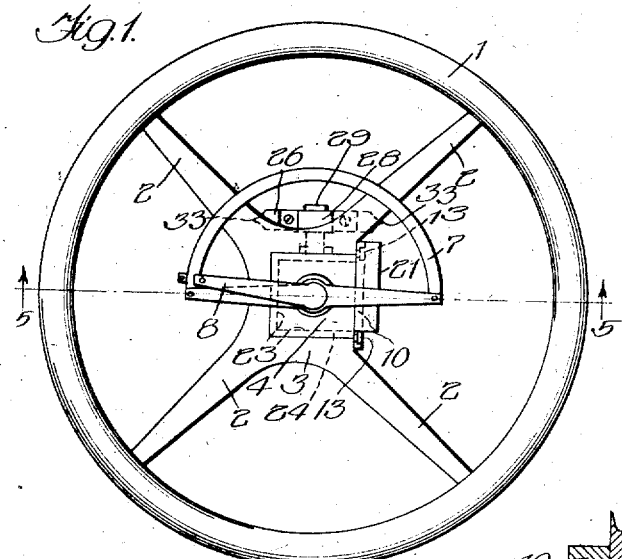
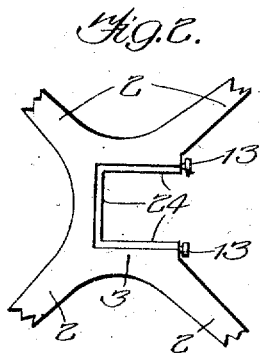
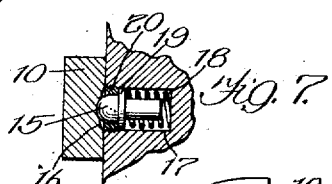
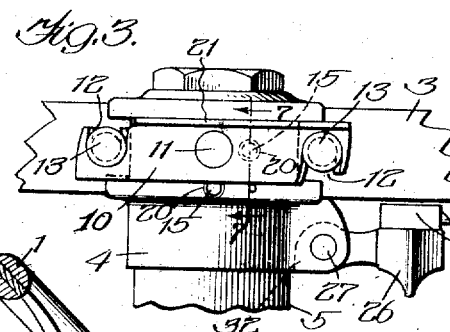
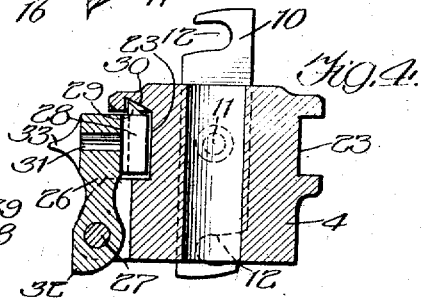
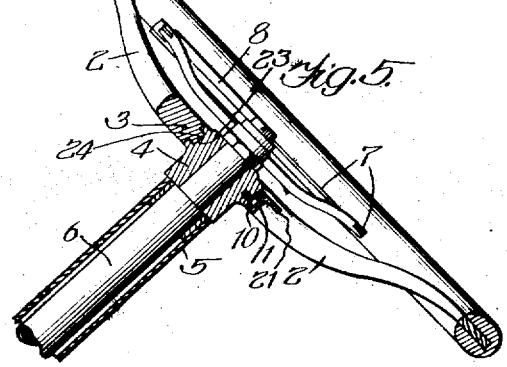
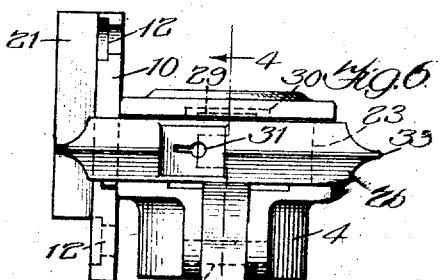
Inventor
William H. Appleby
By Cheever & Cox
Attys W. H. APPLEBY.
STEERING WHEEL.
APPLICATION FILED NOV. 26, 1915.
1,195,548.
Patented Aug. 22, 1916.
2 SHEETS—SHEET 2.
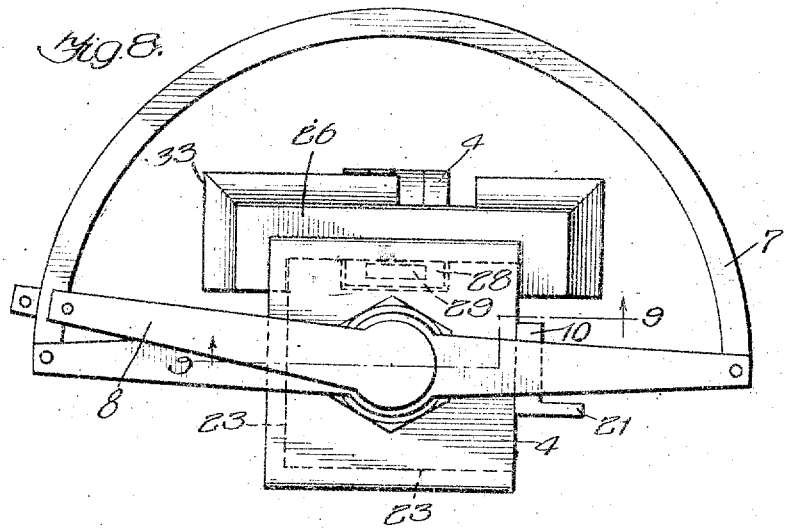
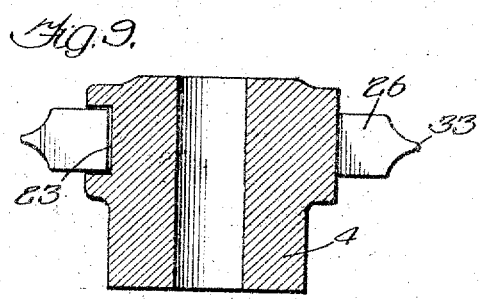
Inventor:
William H. Appleby
By Cheever & Cox
Attys.

UNITED STATES PATENT OFFICE.

WILLIAM H. APPLEBY, OF CHICAGO, ILLINOIS.

STEERING-WHEEL.

1,195,548.  Specification of Letters Patent.  Patented Aug. 22, 1916.

Application filed November 26, 1915.  Serial No. 63,410.

*To all whom it may concern:*

Be it known that I, WILLIAM H. APPLEBY, a subject of the King of Great Britain, residing at Chicago, in the county of Cook and State of Illinois, have invented a certain new and useful Improvement in Steering-Wheels, of which the following is a specification.

My invention relates to steering wheels, more particularly for motor vehicles, and the object of the invention is to provide means whereby the steering wheel may be readily removed and when once removed cannot be replaced without the aid of a key. By this means it is possible for the owner to take the steering wheel with him when he intends to leave the vehicle for any protracted length of time, thus making it practically impossible to steal the vehicle, and it also makes it impossible for any person without the proper key to apply another steering wheel, even though the unauthorized wheel might fit the steering block from which the authentic wheel has been removed.

I accomplish my object by the mechanism illustrated in the accompanying drawings, in which—

Figure 1 is a face view of the steering wheel and parts associated therewith. Fig. 2 is a fragmentary view showing the recessed hub of the wheel. Fig. 3 is a side elevation of a wheel hub, steering block and associated parts. Fig. 4 is an axial section on the line 4—4, Fig. 6. Fig. 5 is an axial section of the wheel and parts by which it is supported and parts which are supported by it. The plane of section is indicated approximately by the line 5—5, Fig. 1. Fig. 6 is a side elevation of the steering post and associated parts looking toward the right in Fig. 4. Fig. 7 is a sectional detail taken on the line 7—7, Fig. 3. Fig. 8 is a top view of the steering block showing the obstructor bar in locked position and also showing the position of the control segment and lever. Fig. 9 is a sectional view of the block on the line 9—9, Fig. 8.

Similar numerals refer to similar parts throughout the several views.

In the form selected to illustrate the invention, the wheel rim 1, is connected by spokes 2 to hub 3 which is rectangularly recessed as best shown in Fig. 2. This recess is open at one side to receive the steering block 4 which is securely fastened to the steering post 5 of the vehicle in any suitable manner and rotates with it. As usual, the steering post is hollow and contains a stationary rod 6 which supports the segment 7 in the usual way. The control lever 8 sweeps over the segment to control the operation of the machine in the usual way. When the wheel is in position upon the steering block, the rotary movement of the wheel is imparted to the block and through it to the steering post. The wheel is rigidly held in position upon the block by a locking bar 10 which in the design shown is pivoted upon the pin 11 projecting laterally from the block. Said bar has notches 12 at the ends for engaging headed pins 13 secured to the wheel hub on opposite sides of the opening therein as best shown in Fig. 2. When the locking bar extends across the open side of the hub it prevents the wheel from being withdrawn from the steering post. It is desirable, in order to prevent the locking bar from jarring loose from its locked position, to provide a yieldable retaining pin 15 which fits into the shallow pocket 16 formed on the inside of the bar as best shown in Fig. 7. This pin slides in a chamber 17 formed in the side of the steering block and is pressed outward by a helical spring 18. The pin has a collar 19 which engages an externally threaded retaining ring 20 which screws into the mouth of the chamber 17 as illustrated. By this construction the locking bar may be rotated by exerting a little force upon it, but it will normally be held by the pin when the bar has been brought to locking position. To assist in manipulating the locking bar it is desirable to form a flange 21 thereon as best shown in Figs. 3 and 6.

According to the selected design, the steering block has grooves 23 formed in three sides thereof which interfit with the tongues 24 formed upon the three closed sides of the hub of the steering wheel. Thus, when the wheel hub is in place upon the block and the locking bar is in locked position, the wheel will be rigidly and securely connected to the steering post and the wheel will operate in the usual manner. As best shown in Fig. 5 the spokes 2 dip as they approach the center, and the plane of the hub and steering block is considerably below the plane of the rim. This makes it possible to slide the wheel off sidewise when the locking bar is unlocked and makes it possible to remove the wheel without interference from the segment 7 or any of its associated parts. In other words, the wheel is removable sidewise with little or no tilting and little or no interference on the part of the steering block or elements fastened thereto. It will be observed that the wheel hub is open at the top as well as at one side. This makes possible the mounting of the control segment and lever above it.

Hinged to the side of the steering block at one of the sides which contacts one of the closed sides of the wheel hub is an obstructor bar 26. This is pivotally supported upon the pin 27 carried by the steering block 4 as best shown in Figs. 3 and 4. The parts are so designed that the bar may be rotated to a position adjacent to the side of the steering block. By preference, a portion of the bar actually enters into one of the grooves 23. The bar is furnished on the inside with a lock 28 having a bolt 29 which enters a socket 30 formed in the center of the block as illustrated in Fig. 4. This bolt is operated by a key which enters through the key-hole 31, see Figs. 4 and 6. By preference the end of the bolt is beveled and the bolt is a spring bolt so that the lock engages automatically when the obstructor bar is swung to locked position. Consequently there is no need for the owner to produce his key except for unlocking. By preference the obstructor bar is longer than the width of the steering block and projects at both ends beyond the sides of the block. As a result, the bar obstructs three of the four sides of the block; that is, it destroys the symmetry of the block in three respects and makes it proportionately more difficult for an unauthorized person to apply anything to the block for operating it. The bar preferably has a tail 32 so configurated as to permit the obstructor bar to be dropped to horizontal position but no farther, the tail engaging the side of the block at this time as indicated in dotted lines Fig 3. It is desirable that a rib or ridge 33 extend along the outside of the bar to make it more difficult for a "would-be" thief to attach anything to the steering block when the obstructor bar is in acting position. According to the present design the obstructor bar is pivoted to the block below the plane of the wheel hub. This renders the bar practically invisible and also keeps it out of the way when it is not in use and the wheel is in position.

In operation, when the vehicle owner intends to leave his car for any length of time he throws back the locking bar 10 from the locking position shown in Fig. 3 to the nonacting position shown in Fig. 4. He then withdraws the wheel from the steering block by moving the wheel sidewise (to the left, Fig. 1.) He then swings the obstructor bar up from the position shown in Fig. 3 to the position shown in Fig. 4. The bar then occupies a position where it will obstruct the corresponding tongue 24 on the wheel hub and prevent any wheel, whether belonging to the rightful owner or not, from being replaced on to the steering block until a person furnished with the key has unlocked the bar and swung it down out of the way.

As a result of my invention, the owner has a double safe-guard for the vehicle. It is improbable that an unauthorized person could, without detection, provide himself with, and make use of, a duplicate wheel. But even with a duplicate wheel it would be impossible to use it without first unlocking the obstructor bar, and it would, as a practical matter, be impossible for an unauthorized person to provide himself with an operable key for all the various types and adjustments of locks with which an individual owner might provide himself. Makers may thus standardize their wheels without danger for, although standardization will make it easier for an unauthorized person to obtain a duplicate wheel, such person will not be able to use it.

Having thus described my invention, what I claim as new and desire to secure by Letters Patent, is:

1. In combination, a steering wheel, a steering post having a steering block detachably attachable to said wheel, the wheel and the block interfitting with each other, and an obstructing element capable of being locked to the center post at a point occupied by one of the parts of the steering wheel when the latter is in acting position.

2. In a vehicle, the combination of a steering post having a steering block, a steering wheel having parts interfitting with parts of the steering block, the wheel being detachable from the block, an obstructing element and means for locking said obstructing element to the center block in position to occupy the space occupied by part of the wheel when the wheel is in position upon the block.

3. In a vehicle, the combination of a steering post, a steering block upon said post, a steering wheel fitting slidingly onto said block, locking means for preventing the wheel from sliding off of the block, and an obstructing element pivoted to the block, and adapted to interlock with said block and thereupon occupy a position occupied by part of the wheel when the wheel is in position.

4. In a vehicle, the combination of a steering post, a steering block upon said post, a steering wheel, said block and said wheel having interfitting guides, locking means for preventing the wheel from accidentally sliding along said guides and becoming thereby dislodged from the block, an obstructor bar pivoted to said block in position to swing adjacent to the block and thereupon occupy space which is occupied by part of the wheel when the wheel is in position, and means for locking and unlocking said obstructing element.

5. In a vehicle, the combination of a steering post provided with a rectangular steering block, a steering wheel having a hub which is closed upon three sides of a rectangle and open upon the fourth side, said hub interfitting slidingly with said block upon three sides, a releasable locking bar for holding the hub in position upon the block, an obstructor bar pivoted to the block and swingable to a position along a side of the block normally occupied by one of the closed sides of the hub, and means for locking and unlocking said obstructor bar.

6. In a vehicle, the combination of a steering post provided with a rectangular steering block having parallel grooves along two of its sides, a steering wheel having a rectangular hub open at one side and provided with parallel tongues on two of its closed sides, said tongue slidingly fitting said grooves, releasable means for preventing the hub from sliding off of the block, an obstructor bar attached to the block and movable to a point along side of one of said grooves to thereby occupy part of the space occupied by the wheel hub when the wheel is in position upon the block, and means for locking and unlocking said obstructor element bar.

7. In a vehicle, the combination of a steering post provided with a rectangular steering block, having parallel grooves along two of its sides, a steering wheel having a rectangular hub open at one side and provided with parallel grooves on two of its closed sides, said tongues slidingly fitting said grooves, releasable means for preventing the hub from sliding off the block, an obstructor bar pivoted to the block at a point beneath the wheel hub, said bar being swingable into one of said grooves when the wheel is absent, and means for locking and unlocking said bar.

8. In a vehicle, the combination of a steering post provided with a transverse steering block having two parallel sides, a steering wheel having a hub provided with guides interfitting with the parallel sides of the block, whereby the hub is slidable relatively to the block in a plane transverse to the axis of the steering post, the wheel having a rim connected to the hub by spokes and the spokes passing upward from the hub to the rim whereby the rim lies in a plane parallel to the hub but considerably above it, releasable means for holding the hub in engagement with the block, an obstructor bar pivoted to the block at a point beneath the hub when the latter is in position, said bar being swingable to a position adjacent to one side of the block to thereby occupy a position normally occupied by part of the hub when the wheel is in position, and means for locking and unlocking said bar.

9. A motor vehicle having a steering post, a steering block rigidly secured to said post and rotating with it, said block being axially apertured, a stationary rod passing up through the aperture in said block, a control segment fastened to said rod above said block, a control lever coöperating with said segment and also located above said block, a steering wheel having a hub which is closed on three sides and engages three sides of the block, the hub being open at the top and open at the fourth side, means at the open side of the hub for securing the hub in position, and a pivotally supported obstructor bar adapted to be locked to one side of the block, the length of the bar being greater than the length of the side to which it locks.

In witness whereof, I have hereunto subscribed my name.

WILLIAM H. APPLEBY.